Feb. 5, 1963  W. M. GRUBER  3,076,603

MATERIALS TESTING EQUIPMENT

Filed March 14, 1956

INVENTOR
Warren M. Gruber
BY
Synnestvedt & Lechner
ATTORNEYS

United States Patent Office 3,076,603
Patented Feb. 5, 1963

3,076,603
MATERIALS TESTING EQUIPMENT
Warren M. Gruber, Horsham, Pa., assignor to Tinius Olsen Testing Machine Company, Willow Grove, Pa., a corporation of Pennsylvania
Filed Mar. 14, 1956, Ser. No. 571,461
7 Claims. (Cl. 235—179)

This invention relates to materials testing equipment and, in particular, relates to a device for automatically obtaining yield strength of materials by the offset method.

In many present-day manufacturing operations, production testing plays an important part in quality control and in product evaluation. For example, in steel mills, many tens of samples are taken from runs and then tested so that the test results can be used in the controlling of the manufacturing process, for example, roll pressure, heat time, composition, etc. Knowledge of yield strength of materials is important, and means for the rapid and highly accurate determination of the same has been a long sought-for objective.

Yield strength has been defined as the stress at which a material exhibits a specified limiting deviation from the proportionality of stress to strain. In testing work, yield strength by the offset method has heretofore been determined by graphic means. This requires the testing of a single specimen to obtain a stress-strain or load-elongation curve, and after this has been done, a line is drawn parallel to the linear portion of the curve but offset therefrom (elongationwise) by a predetermined amount. The load value at the intersection of the curve and the line is a measure of the yield strength for the given offset.

The graphic method of determining offset yield strength has several disadvantages, for example, the chance of error in observing and recording information and in the requiring of highly skilled personnel for curve interpretation. Furthermore, if accuracy is to be obtained with the graphic method, the technician must use utmost care, and this involves a considerable number of man hours, particularly where production testing is involved.

Systems have been developed for determining yield strength other than by the offset method, for example, by the extension under load method. Such systems have an inherent disadvantage in that the accuracy is dependent upon the particular samples being tested having identical load-elongation curves as a previously tested master sample. In other words, it is assumed that the samples tested have the same physical and chemical makeup so that they exhibit the same characteristics under test. However, it is a known fact that samples taken from a run of material do not respond alike under test, and therefore, errors are inevitable. Furthermore, such methods of obtaining yield strength require a trained operator and are dependent upon his skill.

In contrast to the foregoing, the present invention provides a means for automatically determining yield strength by the offset method and/or then initiating some other desired function such as recording of load at that point, and presents a device which eliminates the disadvantages of both the graphic and extension under load methods mentioned above.

One of the objects of the invention is to provide a device for the rapid and accurate determination of yield strength.

Another object of the invention is to provide a device for the rapid and accurate determination of yield strength which is independent of the skill of the operator.

Another object of the invention is to provide a device for the rapid and accurate determination of yield strength which is independent of the qualities or characteristics of a master specimen.

A preferred embodiment of the invention will be described in connection with the drawings appended hereto wherein:

FIGURE 3 is a diagrammatic representation of a typical phase-sensitive device for use in conjunction with the circuit of FIGURE 2;

FIGURE 4 is a diagrammatic representation of a control circuit; and

FIGURE 5 is a diagrammatic representation of a circuit including a servo motor for use in conjunction with the circuit of FIGURE 2.

In the material which follows, the invention is described in connection with tension testing; however, it will be readily understood by those skilled in the art that the invention is applicable for other types of testing, for example, testing in compression, in shear, and the like.

Furthermore, it will be understood that the invention is applicable and finds utility in other types of industrial operations, for example, in connection with straightening machines. Often times in the manufacture of metal parts such as sheets, strips, extrusions, etc., which are of relatively long length, the part will be bowed as it comes from the forming machine. In order to relieve the bow, the part is disposed in a straightening machine which grips the opposite ends and stresses or loads the same to beyond the elastic limit or to the early plastic stages. The present invention is highly useful with such machines as a means for controlling the operation, i.e., permitting load to be applied until the load-elongation curve of the part being straightened has departed from the linear portion a given amount, namely, the preselected offset.

The term "testing machine" as used herein will be understood not only to apply to a machine of the type ordinarily associated with such a term, but also to apply to like machines such as the straightening machine mentioned above.

Figure 1:
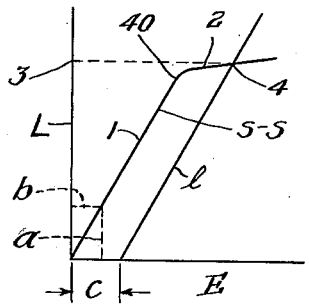
FIGURE 1 illustrates a typical stress-strain or load-elongation diagram.

Returning now to the description, in FIGURE 1 the ordinate L represents values of the load in pounds per square inch applied in tension to a specimen, and the abscissa E represents values of elongation in inches per inch. The curve s—s is a typical stress-strain or load-elongation curve, the bottom portion 1 being linear, and the top portion 2 being non-linear and representing the yield of the specimen. In plotting such a load-elongation curve, a testing machine such as disclosed in copending application of Robert S. Strimel, Serial No. 230,877, filed June 11, 1951, now Patent No. 2,808,721, and a recorder such as disclosed in copending application of Robert S. Strimel, Serial No. 261,239, filed December 12, 1951, now Patent No. 2,812,229, are used. A piece of chart paper is secured to the recorder drum, which is driven or rotated in accordance with the elongation of the piece being tested, and a recording pen driven in accordance with the load applied to the specimen is moved axially across the drum. This compound movement allows the pen to trace out the load-elongation curve in accordance with the properties of the material under test. The slope of the curve is $a/b$ where $a$ and $b$ are respectively increments of load and elongation.

In graphically determining the yield strength, the chart is removed from the drum and a line $l$ is drawn parallel to the linear portion 1 of the s—s curve from a point on the elongation axis which is offset by a predetermined amount or percentage represented by C. The value 3 of the load at the intersection 4 of the curve s—s and the line $l$ is called the yield strength at the selected offset. In standard testing procedure, the yield strength is usually taken at 0.2% offset.

It can be shown that the equation of the line $l$ may be expressed as $O = a/bE - a/bC - L$ where L, E, C and and $a/b$ are as above defined. Further, it can be shown that the equation of the linear portion of the $s$—$s$ curve may be expressed as $L = a/bE$. The particular values of L and E which will satisfy both the curve and the line are expressed by the coordinates' intersection point 4. The material which follows describes a preferred embodiment of a device or computer which will automatically determine said point of intersection and initiate a device to record or indicate the load at that point or to initiate some other function.

Figure 2:
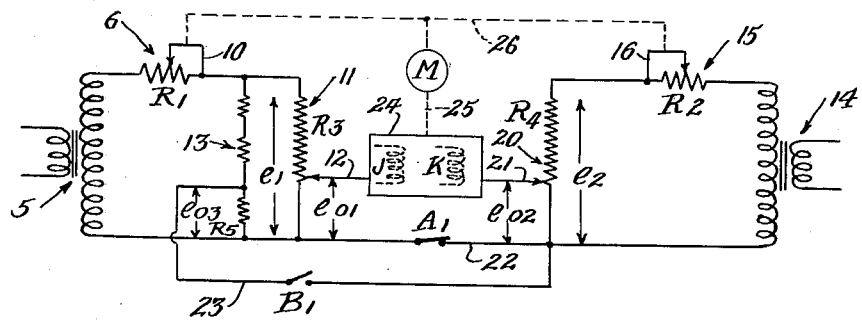
FIGURE 2 is a diagrammatic representation of a circuit of the present invention.
Figure 2:
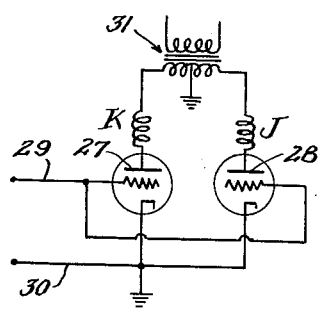
Figure 2:
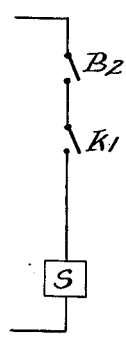
Figure 2:
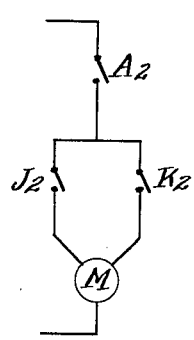

On the left-hand side of FIGURE 2 a power supply transformer 5 has its secondary connected to rheostat 6 comprising the resistor $R_1$ and movable arm 10. Connected with the resistor $R_1$ is a voltage divider 11 comprising the resistor $R_3$ and movable arm 12. A plurality of resistors 13, one of which is designated as $R_5$, is connected in parallel with the resistor $R_3$. On the right-hand side a power supply transformer 14 has its secondary connected to a rheostat 15 comprising the resistor $R_2$ and movable arm 16. Connected in series with the resistor $R_2$ is a voltage divider 20 comprising resistor $R_4$ and the movable arm 21.

The lower ends of the resistors $R_3$ and $R_4$ are interconnected by a line 22 having normally closed contacts $A_1$ and the top side of resistor $R_5$ is connected by a line 23 to the lower end of resistor $R_4$, the line 23 having normally open contacts $B_1$. The movable arms 12 and 21 are electrically connected to a control device 24 which is interconnected, as indicated by the dotted lines 25, to the servo motor M and adapted to operate the same. The servo motor M is arranged to drive the movable arms 10 and 16 as indicated by the dotted lines 26.

From an inspection of FIGURE 2, it will be observed that the voltage across the resistor $R_3$ may be controlled by the position of the movable arm 10. The manner in which arm 10 is moved will be explained shortly. This voltage is designated as $e_1$. The portion of the voltage $e_1$ picked off by the movable arm 12 is designated as $e_{01}$, and in the arrangement is adapted to be zero when the arm is at the lower end of the resistor $R_3$ and a maximum (or equal to $e_1$) when the arm is at the upper end of the resistor $R_3$. The voltage $e_{01}$ represents one input to the control device 24.

On the right-hand side the voltage across the resistor $R_4$ may be controlled by the position of the movable arm 16, and the manner in which the arm is moved will be explained shortly. This voltage is designated as $e_2$. The portion of the voltage $e_2$ which is picked off by the arm 21 is designated as $e_{02}$, and in the arrangement is adapted to be zero when the arm 21 is at the lower end of the resistor $R_4$ and maximum (or equal to $e_2$) when the arm is at the upper end of the resistor $R_4$. The voltage $e_{02}$ represents another input to the control device 24.

In the construction shown with the transformers 5 and 14 energized from the same source and having like polarity, the voltages $e_{01}$ and $e_{02}$ are in series opposition or 180° out of phase. Thus, with the contacts $A_1$ closed and $B_1$ open, the resultant voltage V or input to the device 24 can be expressed as $V = e_{01} - e_{02}$.

Since $e_{01}$ and $e_{02}$ are 180° out of phase, it will be apparent that the phase of the resultant or input voltage will depend on the magnitude of $e_{01}$ and $e_{02}$, i.e., the resultant voltage will be in phase with $e_{01}$ and out of phase with $e_{02}$ or, conversely, in phase with $e_{02}$ and out of phase with $e_{01}$. Preferably the device 24 is selected to be phase-sensitive, that is to say, depending upon the phase of the input voltage, the device will operate to drive the servo motor in a direction to move the arms 10 and 16 to cause the voltages $e_1$ and $e_2$ to be of respective magnitudes such that the voltages $e_{01}$ and $e_{02}$ are equal. In other words, as the arms 12 and 21 are moved along the resistors $R_3$ and $R_4$, the arms 10 and 16 are moved by the servo to adjust the voltages $e_1$ and $e_2$ such that $e_{01}$ and $e_{02}$ are equal. Thus, (except as noted hereinafter) the input to the device 24 is maintained at a predetermined value (in this instance, zero) regardless of the movement of arms 12 and 21.

Several standard phase-sensitive devices are available on the commercial market, for example, the so-called phase-sensitive relays or phase-sensitive amplifiers. It is preferable that the device selected should have two relays (shown in dotted lines in FIGURE 2 and designated by K and J), both of which are adapted to be de-energized when $e_{01}$ and $e_{02}$ are equal, and one of which, say K, is energized (with J de-energized) when $e_{01}$ is greater than $e_{02}$, and J energized (while K is de-energized) when $e_{02}$ is greater than $e_{01}$. A typical example of a phase-sensitive device is shown in FIGURE 3 where tubes 27 and 28 have their grids and cathodes commonly connected together to form the input lines 29 and 30 adapted to receive signals from the arms 12 and 21. In the respective plate circuits of the tubes are relays K and J, both interconnected to plate supply transformer 31. The transformer 31 supplies a reference voltage to the plates of the tubes, and the primary of the transformer is preferably energized from the same source as the transformers 5 and 14. It will be apparent from an inspection of FIGURE 3 that when the input signal on the lines 29 and 30 is zero, neither tube will conduct, so that both relays are de-energized. Also, it will be observed that one or the other of the tubes will conduct, hence energize its associated relay, depending upon the phase relationship of the input voltage and the voltage on the plates, i.e., a tube will conduct when both its plate and grid are positive.

With such an arrangement as mentioned above, a rather convenient circuit can be arranged to drive the motor M. For example, as shown in FIGURE 5, with the relays K and J de-energized, the contacts $K_2$ and $J_2$ are open so that the motor cannot operate. With K energized and J de-energized, the contacts $K_2$ are closed and $J_2$ open so that the motor can turn in one direction. With J energized and K de-energized, the contacts $J_2$ are closed and the contacts $K_2$ open so that the motor can turn in the opposite direction.

When the apparatus above described is used in conjunction with a testing machine, the arms 12 and 21 are adapted respectively to be driven in accordance with the elongation and the load. For example, the arm 12 may be connected to the arrangement driving the recording drum in the above-mentioned Patent No. 2,812,229 while the arm 21 may be connected to the arrangement driving the load pointer in the above-mentioned Patent No. 2,808,721. The contacts $A_1$ and $B_1$ are adapted to be interconnected to the means driving the load pointer such as shown in Patent No. 2,808,721 so as to be simultaneously actuated when the pointer reaches a predetermined load value. The normally closed contacts $A_2$ shown in FIGURE 5 and the normally open contacts $B_2$ shown in FIGURE 4 are also connected and actuated as contacts $A_1$ and $B_1$.

In FIGURE 4 I have diagrammatically illustrated a typical control circuit adapted to be actuated by the de-energizing of the relays. The circuit shown includes the contacts $B_2$ mentioned above, contacts $K_1$ and the control device S. The contacts $K_1$ are adapted to be open when the relay K is de-energized and closed when the relay is energized. When the contacts $B_2$ and $K_1$ are closed, a circuit is completed to the device S so that it is energized. When the contacts $K_1$ are open, the device S will be de-energized. This energizing and de-energizing of the device S is used to initiate the operation of mechanism to record the yield strength, for example, a standard operational pen operated by a solenoid controlled by device S, the pen being set to scribe a mark on the recording chart when S is de-energized. Other load-recording devices can be used, for example, a digital voltmeter or readout circuits causing a typewriter to print. It will be apparent that a control circuit such as described above can be used to initiate other desired functions. For example, in lieu of or in addition to indicating yield strength, it may be desired to speed up, slow down, or stop the test.

The manner in which the apparatus described above operates to automatically determine yield strength will be explained following.

At the start of a test, the arms 12 and 21 are at the lower ends of the resistors $R_3$ and $R_4$, the relays K and J are de-energized and the contacts $A_1$, $A_2$ are closed and the contacts $B_1$, $B_2$ are open. The arms 10 and 16 are positioned on the resistors $R_1$ and $R_2$ in accordance with the position assumed in the previous test.

As the test begins, the arms 12 and 21 are moved along the resistances $R_3$ and $R_4$ and the voltages $e_{01}$ and $e_{02}$ are developed. If these voltages are unbalanced, relay J or K will be energized to close contacts $J_2$ or $K_2$ (FIGURE 5) so that the servo will operate to bring the voltages into balance and the input to the device 24 will be zero as has been previously described.

Inasmuch as the input to the phase-sensitive device is zero, then $e_{01}=e_{02}$. Since the arms 12 and 21 are moved in accordance with the elongation and load, the voltage $e_{01}=e_1b$ and the voltage $e_{02}=e_2a$; or $e_1b=e_2a$; or $e_1/e_2=a/b$. Thus, the ratio of the voltages $e_1$ to $e_2$ is maintained equal or proportional to the slope of the linear portion of the curve $s$—$s$.

The contacts $A_1$, $A_2$ and $B_1$, $B_2$ are arranged to be actuated when the load pointer reaches a predetermined value near yield strength, say, near the point indicated by 40. The actuation of these contacts has the following effect.

First: With reference to FIGURE 5, it will be seen that the opening of the contacts $A_2$ causes the servo motor to be disconnected from the line so that it no longer can operate to drive the arms 10 and 16 and the arms remain fixed in position. Therefore, the voltages $e_1$ and $e_2$ across the resistors $R_3$ and $R_4$ are related to each other as the slope of the load-elongation curve, and these voltages remain fixed for the remainder of the test.

Second: With reference to FIGURE 2, the opening of contacts $A_1$ and closing of contacts $B_1$ causes the voltage $e_{03}$ across the resistor $R_5$ to be in series adding with the voltage $e_{02}$. This voltage then forms part of the input to the device 24. Thus, at this time the input to the device 24 can be expressed as $V=e_{01}-e_{02}-e_{03}$. The value of resistor $R_5$ is chosen (taking into account the value of the group 13, $R_3$, etc.) so that the voltage $e_{03}$ is proportional to a predetermined value of offset C on the elongation axis. Thus, the voltage across $R_5$ can be expressed as $e_{03}=e_1C$. The equation for the input to the device 24 is now $V=e_1b-e_2a-e_1C$. The test, of course, continues after the actuation of the A and B contacts and the last mentioned equation can be written as $V=e_1E-e_2L-e_1C$. This represents a finite input to the device 24 and the relay K will be energized, closing the $K_1$ contacts (FIGURE 4), consequently energizing the device S.

It will be recalled that certain values of E and L will satisfy the equation for the line $l$, namely, $$O=a/bE-a/bC-L$$

or $L=a/bE-a/bC$. As the arms 12 and 21 continue to move in accordance with the elongation and the load, a point will be reached where the input to the device is zero, i.e., the point of intersection 4 of curve $s$—$s$ and line $l$. Thus, $V=O=e_1E-e_2L-e_1C$. Since $e_1$ and $e_2$ are related by the slope of $a/b$, the input equation can be written as $$e_1E-b/ae_1L-e_1C=O$$

or as $a/be_2E-e_2L-a/be_2C=O$. The solution of either equation in terms of L, is $L=a/bE-a/bC$. By recording the value of L when the foregoing equation is true, we have the yield strength at the given percentage offset. This is explained below.

When the point of intersection 4 has been reached and the input to the device 24 is zero, the relay K will be de-energized; consequently, the device S will be de-energized, resulting in an indicating or recording of the stress or load at the instant the foregoing occurs. This will be the yield strength.

The range of operation of the device, that is to say, the range of load-elongation curve slopes that can be handled, is a function of the voltage $e_1$ and $e_2$. This can be controlled by the relationship of the voltages across the secondaries of the transformers 5 and 14 and/or by the resistance ratios $R_2/R_4$ and $R_1/R_3$.

I claim:

1. For a yield strength computer for a testing machine, the subcombination comprising: a first controllable source of electrical power; first means receiving electrical power from said source and operated in accordance with the strain of a specimen under test to develop an electrical signal; a second controllable source of electrical power; second means receiving electrical power from said second source and operated in accordance with the load applied to a specimen under test to develop a second electrical signal; and mechanism receiving said first and second signals and operated thereby and connected to said controllable sources to operate the same to cause energizing of said first and second means in a manner to effect a predetermined relationship between said signals.

2. For a testing machine or the like, a yield strength computer comprising: first means including mechanism responsive to load applied to a specimen under test and mechanism responsive to the elongation of the specimen and operable over an interval of the linear portion of the load-elongation curve of the specimen to develop first and second quantities, the ratio of the first to the second being proportional to the slope of the load-elongation curve; second means connected with said first means and operable at a predetermined point in the load-elongation curve to maintain said quantities constant in the non-linear region of said curve; third means connected with said first and second means and operable after said quantities are rendered constant to multiply the first of said quantities by a quantity corresponding to the load applied to the specimen in the non-linear region of said curve to obtain a first product and to multiply the second of said quantities by a quantity corresponding to the elongation of the specimen in the non-linear region of said curve to obtain a second product and also to multiply the second of said quantities by a quantity corresponding to a predetermined percentage offset on the elongation axis of the load-elongation curve to obtain a third product; and means to receive said products and operable when the sum of the products is a predetermined value for initiating a desired function.

3. For a testing machine or the like, a yield strength computer comprising: first means including mechanism responsive to load applied to a specimen under test and mechanism responsive to the elongation of the specimen and operable over an interval of the linear portion of the load-elongation curve of the specimen to develop first and second electrical signals, the ratio of the first to the second being proportional to the slope of the load-elongation curve; second means connected with said first means and operable at a predetermined point in the load-elongation curve to maintain said signals constant in the non-linear region of said curve; third means connected with said first and second means and operable after said signals are rendered constant to multiply the first of said signals by a quantity corresponding to the load applied to the specimen in the non-linear region of said curve to obtain a first product and to multiply the second of said signals by a quantity corresponding to the elongation of the specimen in the non-linear region of said curve to obtain a second product and also to multiply the second of said signals by a quantity corresponding to a predetermined percentage offset on the elongation axis of the load-elongation curve to obtain a third product; and means to receive said products and operable when the sum of the products is a predetermined value for indicating yield strength.

4. For a testing machine or the like, a yield strength computer comprising: first means including mechanism responsive to load applied to a specimen under test and mechanism responsive to the elongation of the specimen and operable over an interval of the linear portion of the load-elongation curve of the specimen to develop first and second voltages, the ratio of the first to the second being proportional to the slope of the load-elongation curve; second means connected with said first means and operable at a predetermined point in the load-elongation curve to maintain said voltages constant in the non-linear region of said curve; third means connected with said first and second means and operable after said voltages are rendered constant to multiply the first of said voltages by a quantity corresponding to the load applied to the specimen in the non-linear region of said curve to obtain a first product and to multiply the second of said voltages by a quantity corresponding to the elongation of the specimen in the non-linear region of said curve to obtain a second product and also to multiply the second of said voltages by a quantity corresponding to a predetermined percentage offset on the elongation axis of the load-elongation curve to obtain a third product; and means to receive said products and operable when the sum of the products is a predetermined value for indicating a value corresponding to the load applied to a specimen.

5. In a yield strength computer for a testing machine, the sub-combination comprising:
a first controllable source of electrical power, including a control element to control the power output of the source;
first means energized by electrical power from said source and developing first electrical output power and having a control member operated in accordance with the strain of a specimen under test to control the first output power;
a second controllable source of electrical power, including a control element to control the power output of the second source;
second means energized by electrical power from said source and developing second electrical output power and having a control member operated in accordance with the load applied to a specimen under test to control the second output power; and
mechanism receiving and operated by said first and second output powers and having means connected to each said controllable source to operate the control element thereof to energize said first and second means in a manner to effect a predetermined relationship between said first and second output powers.

6. In a yield strength computer for a testing machine, the sub-combination comprising:
a source of electrical power;
first means energized by electrical power from said source and developing first electrical output power and having a control member operated in accordance with the strain of a specimen under test to control the first output power;
a controllable source of electrical power, including a control element to control the power output of the source;
second means energized by electrical power from said controllable source and developing second electrical output power and having a control member operated in accordance with the load applied to a specimen under test to control the second output power; and
mechanism receiving and operated by said first and second output powers and having means connected to said controllable source to operate the control element thereof to energize said second means in a manner to effect a predetermined relationship between said first and second output powers.

7. In a yield strength computer for a testing machine, the sub-combination comprising:
a first controllable source of electrical power, including a control element to control the power output of the source;
first means energized by electrical power from said source and developing first electrical output power and having a control member operated in accordance with the strain of a specimen under test to control the first output power;
a second source of electrical power;
second means energized by electrical power from said second source and developing second electrical output power and having a control member operated in accordance with the load applied to a specimen under test to control the second electrical output power; and
mechanism receiving and operated by said first and second output powers and having means connected to said controllable source to operate the control element thereof to energize said first means in a manner to effect a predetermined relationship between said first and second output powers.

References Cited in the file of this patent

UNITED STATES PATENTS

| 2,501,058 | Klasek | Mar. 21, 1950 |
| 2,775,886 | Lathrop et al. | Jan. 1, 1957 |
| 2,808,721 | Strimel | Oct. 8, 1957 |
| 2,857,568 | Hering et al. | Oct. 21, 1958 |
| 2,857,758 | Snyder | Oct. 28, 1958 |

FOREIGN PATENTS

| 553,947 | Great Britain | June 11, 1943 |

OTHER REFERENCES

Analog Method in Computation and Simulation (Soroka), 1954, pg. 123.